(12) United States Patent
Harrah

(10) Patent No.: US 8,601,766 B2
(45) Date of Patent: Dec. 10, 2013

(54) BUILDING SYSTEM FOR FORMING A WOODEN PANEL INTO A POWDER COATED WALL STRUCTURE

(75) Inventor: David Harrah, Corning, CA (US)

(73) Assignee: Paskenta Building Systems, Inc., Corning, CA (US)

( * ) Notice: Subject to any disclaimer, the term of this patent is extended or adjusted under 35 U.S.C. 154(b) by 308 days.

(21) Appl. No.: 13/167,210

(22) Filed: Jun. 23, 2011

(65) Prior Publication Data
US 2012/0324818 A1 Dec. 27, 2012

(51) Int. Cl.
*E04C 2/38* (2006.01)

(52) U.S. Cl.
USPC .............................. 52/656.1; 52/656.6; 52/455

(58) Field of Classification Search
USPC .............. 52/79.1, 79.12, 656.1–656.6, 481.1, 52/455, 764, 800.1, 475, 780, 653.1, 210
See application file for complete search history.

(56) References Cited

U.S. PATENT DOCUMENTS

| | | | |
|---|---|---|---|
| 1,635,466 A * | 7/1927 | De Penning | 52/800.13 |
| 1,747,339 A * | 2/1930 | Walper | 428/122 |
| 3,802,393 A * | 4/1974 | Naylor | 119/524 |
| 4,021,988 A * | 5/1977 | Edeus et al. | 52/656.4 |
| 4,182,080 A * | 1/1980 | Naylor | 49/410 |
| 4,258,511 A * | 3/1981 | Strain | 52/79.1 |
| 4,273,072 A * | 6/1981 | Choisel | 119/516 |
| 4,353,193 A * | 10/1982 | Sanderson | 52/476 |
| 4,513,555 A * | 4/1985 | Johnson | 52/657 |
| 4,552,094 A * | 11/1985 | Johnson | 119/523 |
| 4,939,880 A * | 7/1990 | Wang | 52/473 |
| 4,987,713 A * | 1/1991 | Delafield | 52/204.597 |
| 5,220,764 A * | 6/1993 | James | 52/473 |
| 5,592,787 A * | 1/1997 | Ophardt | 52/34 |
| 6,032,423 A * | 3/2000 | Takemura et al. | 52/235 |
| 6,643,986 B2 * | 11/2003 | Commins et al. | 52/483.1 |
| 2009/0211190 A1 * | 8/2009 | Honey | 52/309.3 |

* cited by examiner

*Primary Examiner* — Brian Glessner
*Assistant Examiner* — Paola Agudelo
(74) *Attorney, Agent, or Firm* — David R. Heckadon; Gordon & Rees, LLP

(57) ABSTRACT

A method of assembling a powder coated wall frame supporting a wooden panel therein, by: (1) powder coating various metal members; (2) connecting top and side metal members together to form a frame having an open bottom; (3) inserting a wooden panel into the open bottom of the frame; and then (4) connecting a bottom metal member onto the side members, thereby sealing the wooden panel within the metal frame structure.

10 Claims, 5 Drawing Sheets

BUILDING SYSTEM FOR FORMING A WOODEN PANEL INTO A POWDER COATED WALL STRUCTURE

TECHNICAL FIELD

The present invention relates to systems for building barn walls and animal stalls and pens.

BACKGROUND OF THE INVENTION

Existing building wall systems for barns and animal stalls typically use galvanized steel members that are welded together. This has its disadvantages, especially when it is desired to have a portion of the wall system incorporate a wooden panel. Basically, the problem is that the wooden panel needs to be enclosed within the wall frame prior to welding the various frame pieces together. It is difficult to weld metal in close proximity to wood. Therefore, it is necessary to shield the wood from the heat of the welding (while welding in very close proximity to the wood).

It would instead be desirable to provide a strong metal wall system that incorporates a wooden panel yet does not require welding around the wooden piece(s) during assembly. In addition, it would also be desirable to provide a wall frame that has metal members that are powder coated (since powder coated metals are more resistant to scratching and also retain paint longer). Unfortunately, it is not possible to weld together powder coated metals. The present invention provides a solution to the above problems by providing a wall frame that has powder coated metal members and a wooden panel which are held together without any welding. This results in a strong aesthetically appealing wall structure that is safe and easy to assemble.

SUMMARY OF THE INVENTION

The present invention provides a powder coated metal wall frame structure that is designed such that it can receive a wooden panel therein. The various metal parts are bolted together which is very advantageous when working with a combined wood and metal structure. Most importantly, it is not necessary that any metal parts be welded together. This avoids the problem of having to shield the wooden panel from the heat of welding. Secondly, the metal wall frame structure is powder coated. This makes the metal structure more resistant to scratching and able to retain paint longer. Specifically, the metal structure is preferably bolted together (which is advantageous since it is not possible to weld powder coated metal pieces together). Thus, the present metal frame system avoids the need for any welding equipment at all. Third, the present metal frame can be assembled quickly and easily, such that the wooden panel itself can be quickly slipped into the wall frame during assembly. Thus, a further advantage is that the wooden panel can be inserted as a whole into the frame (as opposed to being inserted into the wall frame in sections, although the present invention covers both approaches).

DETAILED DESCRIPTION OF THE DRAWINGS

FIGS. 1 to 7B all show various aspects of the structure of the present invention. The present invention encompasses both a metal wall structure that encloses a wooden panel therein, and a method of assembling the wall structure so as to enclose the wooden panel therein.

Figure 1:
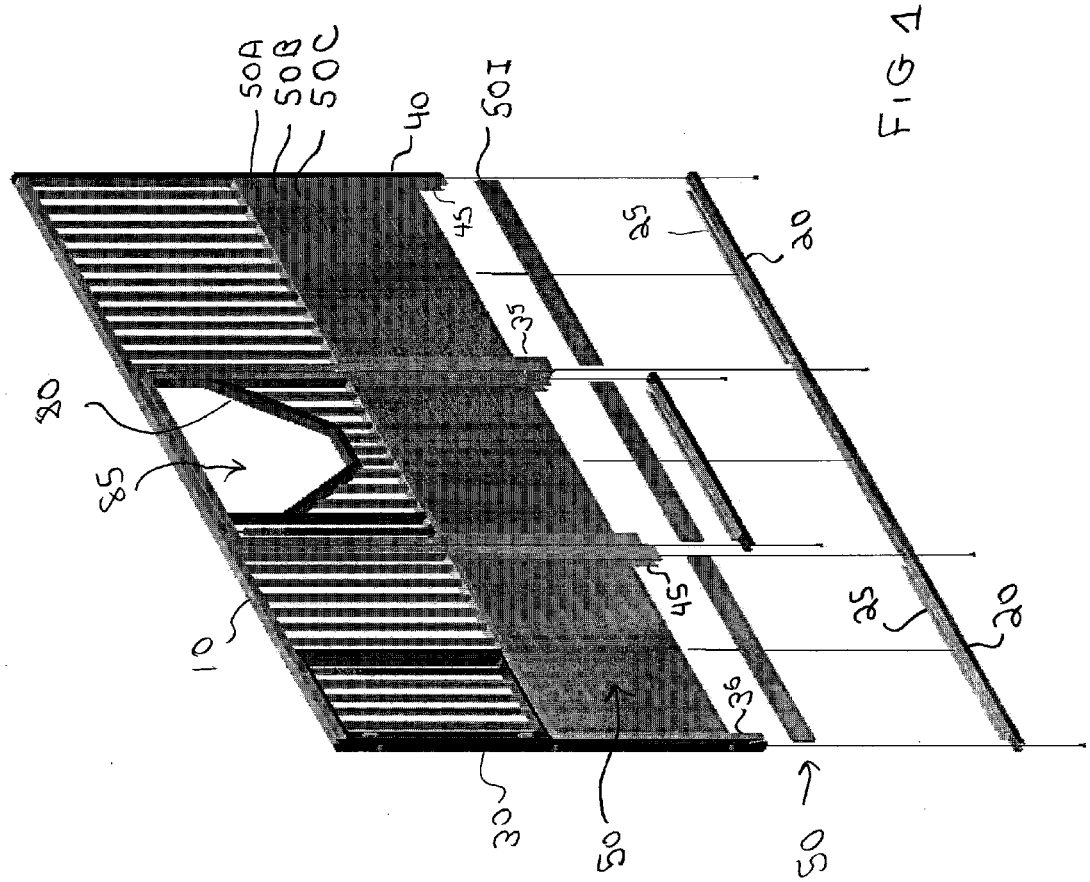
FIG. 1 is an exploded perspective view of the present wall structure (showing insertion of the wooden panels).
Figure 2:
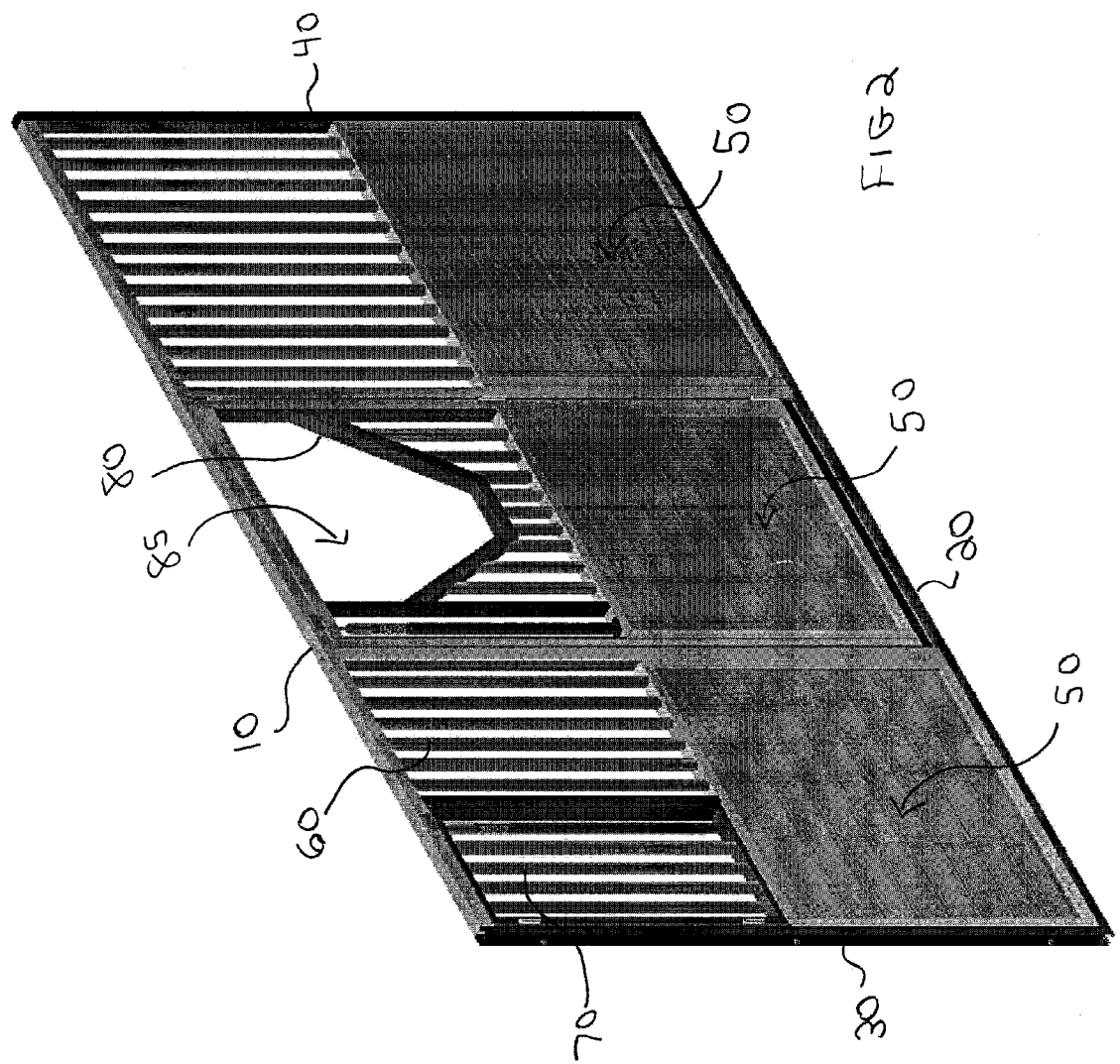
FIG. 2 is an assembled perspective view of the present wall structure (after the wooden panels have been installed).
Figure 3:
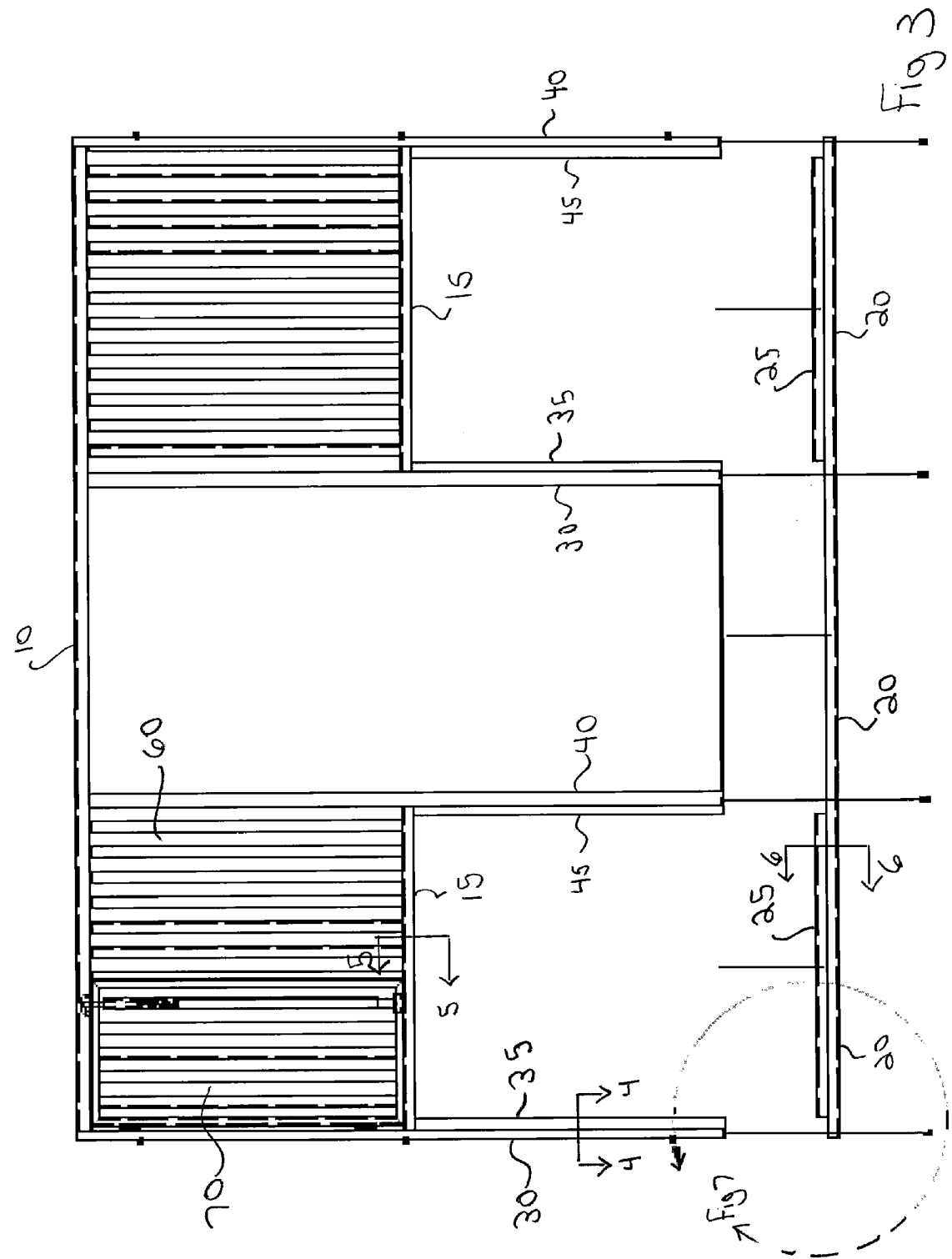
FIG. 3 is a front elevation view of the present wall structure (with the central door and wooden panels removed for illustration purposes).

FIGS. 1 to 3 show the wall structure as a three part system, with the two side portions each having a lower wooden panel and an upper barred window section. In FIGS. 1 and 2, the center portion also has a lower wooden panel and an upper barred window section, however, this center portion is a hinged door with a portion of the upper barred window being left open for a horse to stick their head through. It is to be understood that the present invention encompasses versions with or without this center doorway. It is also to be understood that the present invention also encompasses versions with a wooden panel that extends partially or fully between the top and bottom members. In various embodiments, the top portion may be made of window bars, or the top portion may be left open. In addition, the top and bottom portions may be made of one or more wooden panel sections. Thus, the present invention will be described as the portion of the wall structure covering any one of the "thirds" shown in FIGS. 1 to 3.

As such, the present invention comprises a variety of different metal members, as follows: top member 10; bottom member 20; left side member 30; and right side member 40. Members 10, 20, 30 and 40 are all made of steel that has been powder coated. As typically, understood, powder coating typically involves applying a thermoplastic or thermoset polymer electrostatically and then heat curing the thermoplastic or thermoset polymer.

Figure 4:
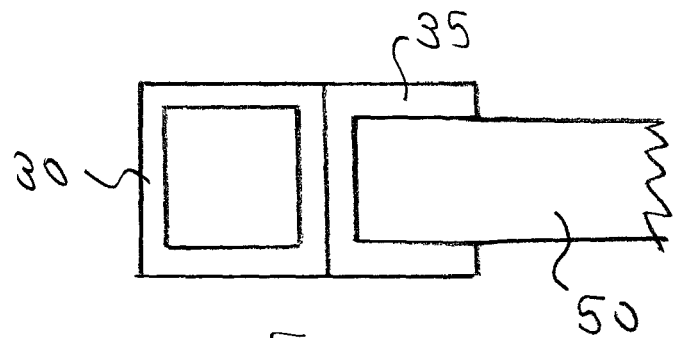
FIG. 4 is a view taken along line 4-4 in FIG. 3 (i.e.: looking straight down).
Figure 5:
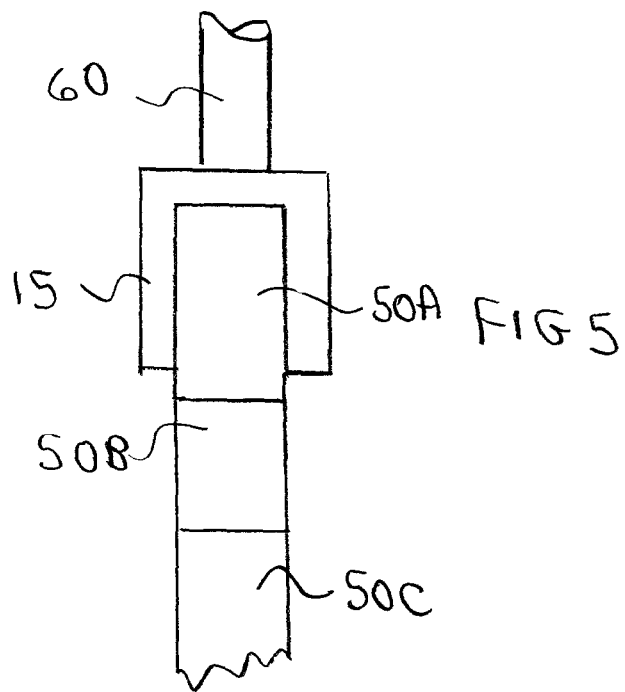
FIG. 5 is a view taken along line 5-5 in FIG. 3 (i.e.: looking horizontally to the left).
Figure 6:
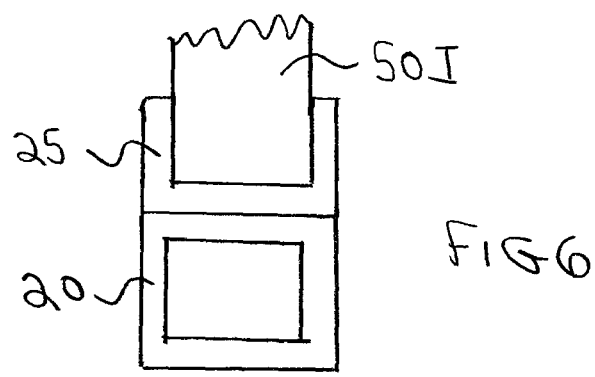
FIG. 6 is a view taken along line 6-6 in FIG. 3 (i.e.: looking horizontally to the left).

A plurality of channel members are also included, being: top channel member 15; bottom channel member 25; left side channel member 35; and right side channel member 45. Channel members 15, 25, 35 and 45 are all powder coated as well. As can be seen in FIGS. 4, 5 and 6, channel members 15, 25, 35 and 45 are all dimensioned with a C-shaped cross section (so as to support both the front and back edges of the wooden panel that is inserted into the wall structure).

As will be shown, the present invention is assembled as follows. First, a metal frame structure (having an open bottom end) is assembled. Next, one or more wooden panel sections may be slid into the open bottom end of the metal frame. (FIGS. 1 and 2 show a plurality of wooden sections inserted one after another, but it is to be understood that one single wooden panel section can be used instead). Finally, the bottom metal member is attached to the frame, sealing the wooden panel within the metal frame. The wooden panel is held in position by the four channel members (15, 25, 35, and 45). Specifically, left channel member 25 is connected to left side member 20. Right channel member 45 is connected to right side member 40. Bottom channel member 25 is connected to bottom member 20. Top channel member 15 spans horizontally between the left and right side members 30 and 40 mid way up along members 30 and 40, as shown. Top member 10 is connected to the top ends of the left and right side members 30 and 40, respectively. Any or all of these connections can be done by bolting the members together.

Figure 7A:
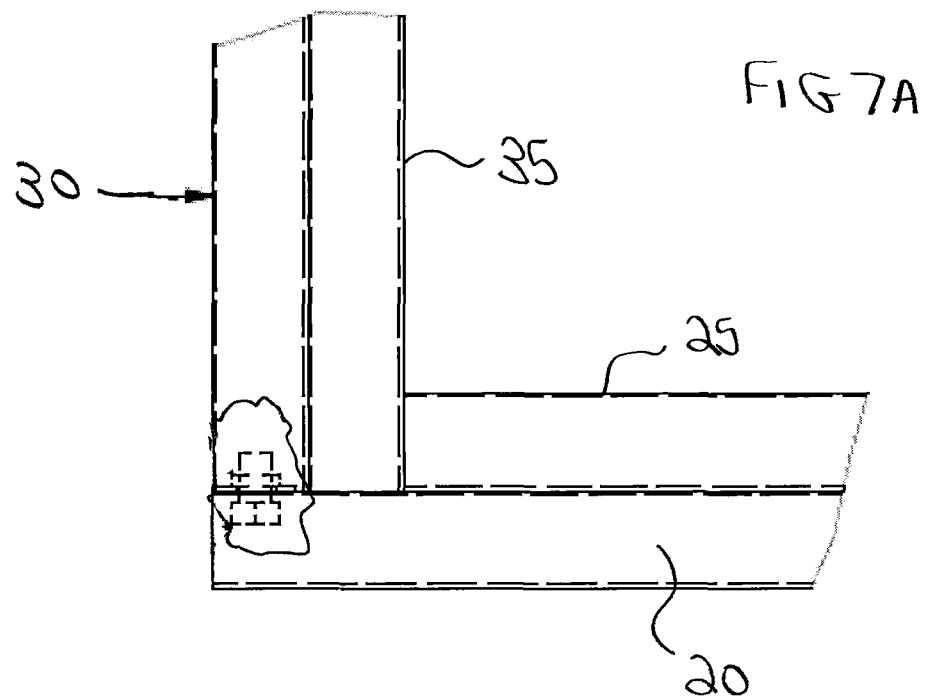
FIGS. 7A and 7B are enlarged front and side views of a portion of the structure of FIG. 3, showing the connection between the bottom and left side members.
Figure 7B:
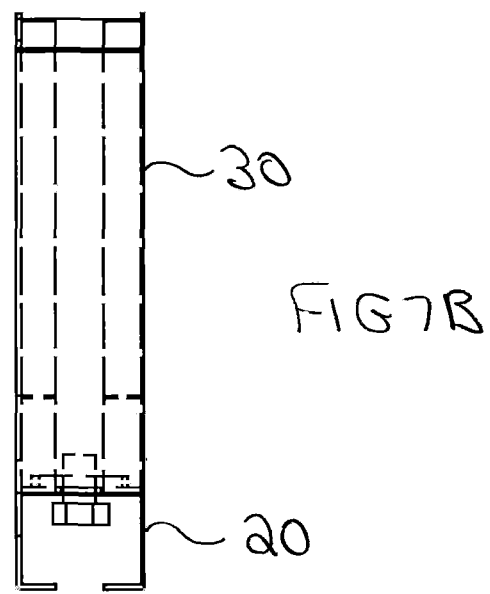

Next, wooden panel sections 50A, 50B, 50C . . . 50I are slid upwards and received within the left, right, top and bottom channel members 15, 25, 35, and 45 such that the top channel member 15 supports the top end of full wooden panel 50, left channel member 30 supports the left side of wooden panel 50, the right channel member 40 supports the right side of wooden panel 40. Specifically, wooden panel 50 (or its component sections 50A, 50B, 50C, . . . etc.) are simply slipped up between channel members 35 and 45 until its top end reaches (and slips into) channel member 15. Each of the left, right, top and bottom channel members 15, 25, 35 and 45 support the front and back of wooden panel 50. Then, bottom member 20 is connected to bottom ends of the left and right side members 30 and 40, enclosing wooden frame 50. FIG. 7A illustrates a close up front view of the bolted connection of members 30, 35, 20 and 25. FIG. 7B illustrates a corresponding side view. In various optional embodiments of the invention, the top portion of the wall structure (between top member 10 and top channel member 15) may be barred window (with vertical, tubular metal bard 60 spanning between top member 10 and top channel member 15). In other optional embodiments, a moveable window frame 70 may be positioned between top member 10 and top channel member 15. Window frame 70 may be hinged to open or close. As can also be seen, the top portion of the wall structure can optionally comprise a full hinged door 80, with an open portion 85 through which a horse may put their head.

It is to be understood that the present invention encompasses one wooden panel 50, or any number of component wooden panels 50A, 50B, 50C . . . etc. that are simply slipped one by one up into the open frame of members 10, 30 and 40 as the device is assembled.

What is claimed is:

1. A powder coated wall frame structure supporting a plurality of wooden panels therein, comprising:
   a powder coated top member;
   a powder coated bottom member;
   a plurality of powder coated left side members;
   a plurality of powder coated right side members;
   a plurality of powder coated top channel members;
   a plurality of powder coated bottom channel members;
   a plurality of powder coated left channel members;
   a plurality of powder coated right channel members;
   a plurality of wooden panels, wherein:
   a plurality of wooden panel receiving structures are formed by assembling the members such that each wooden panel receiving structure is formed by:
   (a) each of the plurality of powder coated left channel members being connected to an associated powder coated left side member;
   (b) each of the plurality of powder coated right channel members being connected to an associated powder coated right side member;
   (c) each of the plurality of powder coated bottom channel members being connected to the powder coated bottom member;
   (d) each of the plurality of powder coated top channel members spans horizontally between an associated pair of powder coated left and right side members, and spans mid-way along said pair of members;
   (e) the powder coated top member being connected to top ends of the plurality of powder coated left and right side members;
   (f) the powder coated bottom member being connected to bottom ends of the plurality of powder coated left and right side members; and wherein
   each of the plurality of wooden panels is received within an associated frame formed by the left, right, top and bottom channel members such that the top channel member supports the top end of the wooden panel, the left channel member supports the left side of the wooden panel, and the right channel member supports the right side of the wooden panel,
   wherein the members are bolted together, with bolts, to hold the wooden panel with a channel formed by the channeled members, and wherein the bolts do not pass through the wooden panel,
   wherein the top, bottom and side members form a powder coated outer frame around the powder coated channeled members.

2. The structure of claim 1, wherein each of the left, right, top and bottom channel members support front and back sides of the wooden panel.

3. The structure of claim 1, further comprising:
   parallel members connected between the top member and the top channel member.

4. The structure of claim 3, wherein the parallel members are tubular and are spaced apart from one another.

5. The structure of claim 1, further comprising:
   a window frame positioned between the top member and the top channel member.

6. The structure of claim 5, wherein the window frame is hinged to open or close.

7. The structure of claim 1, wherein all of the members are made of steel.

8. The structure of claim 1, wherein all of the members are powder coated by a thermoplastic or thermoset polymer.

9. The structure of claim 1 wherein the wooden panel is a single piece of wood.

10. The structure of claim 1 wherein the wooden panel is a plurality of wood sections.

\* \* \* \* \*